C. A. SULLIVAN.
WHEEL.
APPLICATION FILED AUG. 30, 1920.
1,394,372. Patented Oct. 18, 1921.
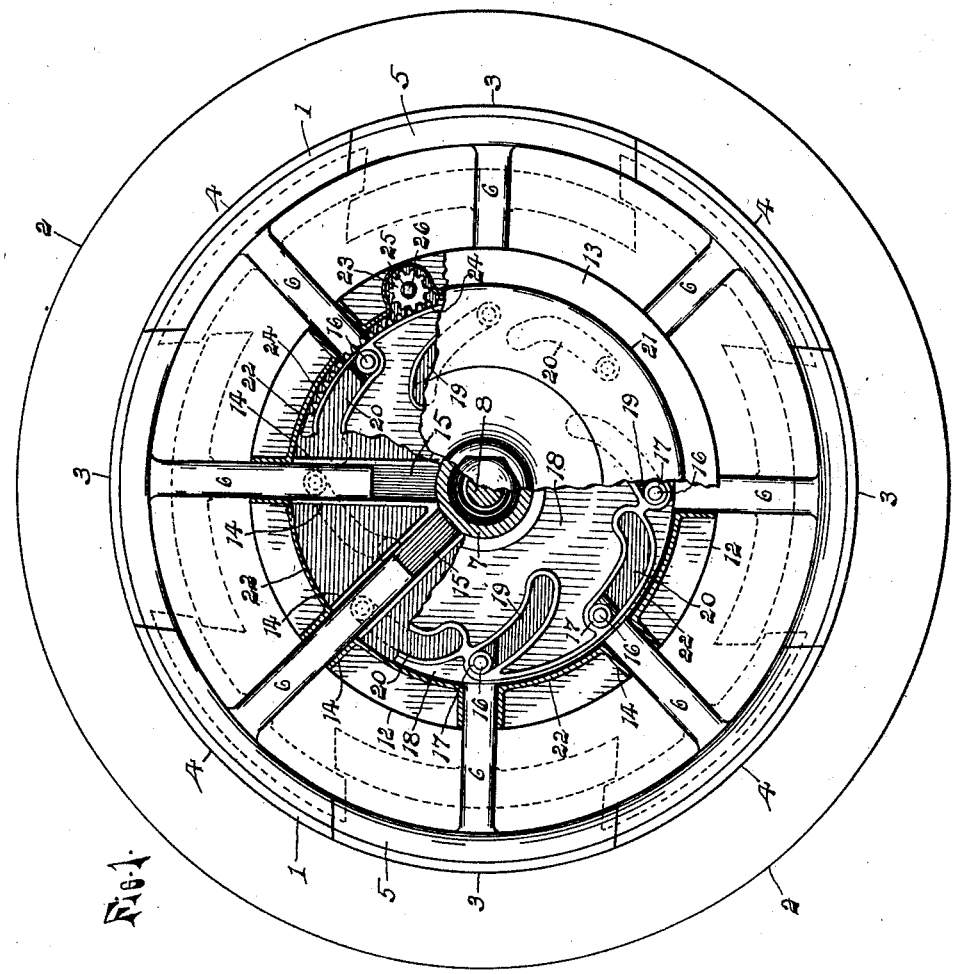
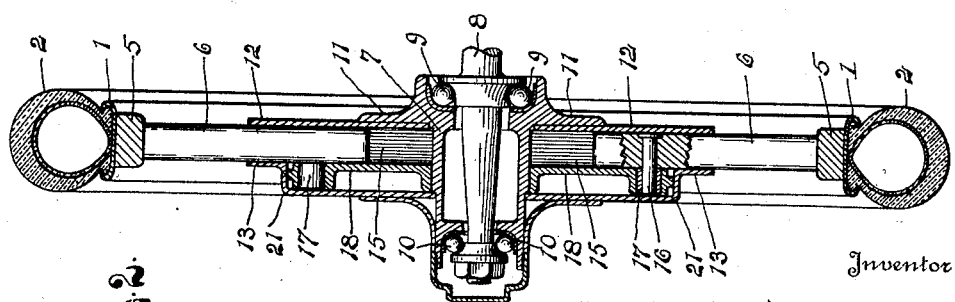
Inventor
Charles A. Sullivan
By
Attorney

UNITED STATES PATENT OFFICE.

CHARLES A. SULLIVAN, OF DETROIT, MICHIGAN.

WHEEL.

1,394,372.     Specification of Letters Patent.    Patented Oct. 18, 1921.

Application filed August 30, 1920. Serial No. 406,759.

*To all whom it may concern:*

Be it known that I, CHARLES A. SULLIVAN, a citizen of the United States of America, residing at Detroit, in the county of Wayne and State of Michigan, have invented certain new and useful Improvements in Wheels, of which the following is a specification, reference being had therein to the accompanying drawings.

This invention relates to a vehicle wheel construction wherein the rim is adapted to be collapsed for quick removal of the tire and its object is to provide simple, convenient operating means for collapsing the rim and for supporting and rigidly holding the same in extended or operative position.

A further object is to provide a very rigid, compact construction having a minimum number of movable parts and wherein these parts are incased and protected from dust and water, and efficient rigid guides are provided for the several rim sections.

It is also an object to provide an arrangement whereby the tire is released by a minimum movement of rim parts and an inward radial movement of the parts secured, said parts together forming an even substantially continuous rim when in operative position.

With the above and other ends in view the invention consists in the matters hereinafter set forth and more particularly pointed out in the appended claims, reference being had to the accompanying drawing in which—

Figure 1 is a side elevation of a wheel illustrative of the invention and showing the parts broken away and in section to more clearly disclose the construction, and Fig. 2 is a transverse vertical section through the same.

In the drawing, 1 indicates a metal rim of the usual contour in cross section to receive and hold the usual form of pneumatic tire 2, said metal rim being made up of a plurality of pairs of sections 3 and 4 which, when in operative position, are in abutting relation. 5 indicates the usual wood felly which is also made up of a plurality of independent sections corresponding in length to the sections 3 and 4 and the abutting ends of the several sections 3 which make up the metal rim 1 and wood felly 5 are so formed that said sections 3 are free to move radially inward of the wheel from between the ends of the adjacent sections 4, the ends of which are correspondingly formed to fit against the ends of the intermediate section 3. Each of the rim sections 3 and 4 is provided with a single spoke 6 which may have any desired cross sectional form but is preferably of rectangular form in cross section and may be constructed of any suitable material such as wood or metal with the outer end of each spoke rigidly and firmly attached to the inner felly 5 which may also be made of wood or metal.

7 indicates a hub of any suitable construction to turn upon or to turn with an axle 8, the construction shown being adapted to turn freely upon the axle, ball bearings 9 and 10 being interposed between the hub and axle. At its inner end the hub 7 is preferably formed with a flange 11 to which is rigidly secured an inner disk or plate 12 engaging the inner sides of the several spokes 6 and in opposed spaced relation to the plate is a plate or disk 13 in contact with the outer sides of the spokes. Arranged between the plates 12 and 13 and formed integral therewith or permanently secured thereto, are strips 14 in contact with the front and rear sides of the spokes, said strips 14 and plates 12 and 13 thus, together, forming radial guide-ways 15 for the several spokes. Secured to each spoke near its inner end is a pin 16 which may be rigidly secured to the spoke in any suitable manner as by passing through an opening in the spoke, and projects beyond the outer face of the spoke, the projecting outer end of the pin being preferably provided with a roller sleeve 17.

Mounted to turn freely upon the hub 7 in contact with the outer sides of the several spokes is a cam disk 18 provided with a plurality of pairs of cam slots 19 and 20 into which the outer projecting ends of the pins 16 with their anti-friction roller sleeve 17 project. The rollers upon the ends of the spokes which carry the several rim sections 3 engage the cam slots 19 and the cam slots 20 are engaged by the rollers on the spokes of the rim sections 4. These several slots 19 are arranged eccentrically to the axis of their disk so that upon rotation of this disk in the proper direction the several rim sections 3 will be rapidly moved radially inward. That portion of the cam slots 20 which is traversed by the rollers of the sections 4, while the rollers of the sections 3 are traversing a major portion of the length of the cam slots 19, is arranged concentric with the axis of the cam disk so that the several rim sections 4 will be held stationary while the several rim sections 3 are moved radially inward a sufficient distance to clear the ends of the sections 4. The inner ends of the several cam slots 19 and 20 are formed eccentric to the axis of the disk so that after the rim sections 3 have been drawn inwardly a sufficient distance to clear the sections 4, then all of the sections will be simultaneously moved inward a short distance by further rotation of the cam disk.

By this arrangement the rim or felly is made up of a plurality of independent sections which, when in operative position, form, in effect, a continuous rim, the ends of the several sections being in firm abutting relation, and by moving the several sections 3 in advance of the sections 4, all of the sections may be moved radially inward to contact the rim and release the tire 2 therefrom. The cam disk affords simple and convenient means for operating the several sections and at the same time provides a rigid and efficient support for the several spokes to rigidly hold the several sections in expanded or operative position, the several rollers carried by the spokes and engaging the cam slots in the disks, forming rigid connections between the inner ends of the spokes and the cam disk.

In order that the cam 18 with its several cam slots may be inclosed and protected against dirt and water, the plate 13 is recessed as indicated at 21 in Fig. 2, to receive the cam disk, said disk turning freely within said recess upon the hub adjacent the outer faces of the several spokes. The casing thus formed by the plate 13 also assists in guiding and strengthening the disk which lies against the outer faces of the spokes and assists in guiding these spokes in their radial movement within the several guide ways 15. The disks 12 and 13 which are rigidly attached to the hub, together with the cross plates 14 between these disks, forming a casing within which the moving parts are inclosed and protected, the rim of this casing between the several spokes being closed by a transverse wall 22 which is made integral with or otherwise secured to the plates 12, 13 and 14. This casing is thus made dirt and water tight and may contain lubricant for lubricating the several moving parts, the only opening in this casing being the outer ends of the guide-ways 15 into which the several spokes extend, said spokes fitting closely therein and closing said ends of the guide ways to prevent dirt and water from getting into the casing and the lubricant from getting out.

As all of the parts are held stationary during normal use of the wheel, there is no movement of the spokes in their guide-ways except when the cam disk is turned to operate the rim sections and release the tire.

Any convenient means may be employed for rotating the cam disk 18 but as illustrative of such means a pinion 23 is shown mounted within the casing in engagement with teeth 24 formed on the periphery of the cam disk. The shaft or axle 25 upon which the pinion 3 is rigidly mounted is preferably extended through the front plate 13 of the casing and has a formed outer end 26 to which a suitable crank may be applied for turning the shaft and gear to rotate the cam disk.

Obviously changes may be made in the form, construction, and arrangement of the several parts as shown, within the scope of the appended claims, without departing from the spirit of the invention and I do not therefore limit myself to the construction and arrangement shown and described.

What I claim is:—

1. In a vehicle wheel the combination of a felly comprising a plurality of independent sections, and means for moving alternate sections radially inward in advance of the intermediate sections.

2. In a vehicle wheel, the combination of a felly formed of a plurality of independent sections in endwise abutting relation when in operative position, and means for moving coincidently alternate sections radially inward and for moving the intermediate sections radially inward after the alternate sections have been moved inward beyond the intermediate sections.

3. In a vehicle wheel, the combination of a felly formed of a plurality of sections, a hub, a casing on the hub formed with guide ways, spokes secured to the sections and slidable in said guide ways, and means in said casing for moving the spokes in their guide ways to move the sections radially inward.

4. In a vehicle wheel, the combination of a felly formed of a plurality of sections, a hub, a casing on the hub formed with guide ways, spokes secured to the sections and slidable in said guide ways, and a rotatable cam member in the casing for moving the spokes in said ways.

5. In a vehicle wheel, the combination of a felly formed of a plurality of sections, a hub, a casing on the hub formed with guide ways, spokes secured to the sections and slidable in the guide ways, a rotatable cam member in the casing having cam slots, means on the spokes engaging the cam slots, and means for rotating the cam member.

6. In a vehicle wheel, the combination of a felly formed of a plurality of sections, a hub, a casing on the hub formed with guide ways, spokes secured to the sections and slidable in the guide ways, a rotatable cam member in the casing having cam slots, laterally projecting members on the spokes engaging said cam slots, and means in the casing for rotating said member.

7. In a vehicle wheel, the combination of a felly formed of a plurality of independently movable sections arranged end to end in abutting relation, a hub, a casing on the hub having radial guide ways, spokes secured to the sections and movable endwise in said guide ways, a member rotatively mounted on said hub and formed with cam slots and teeth, means on said spokes engaging said cam slots, and a pinion in said casing engaging the teeth on said rotatable member for turning the same.

In testimony whereof I affix my signature in presence of two witnesses.

CHARLES A. SULLIVAN.

Witnesses:
LEWIS E. FLANDERS,
ANNA M. DORR.